3,041,272
PROCESS FOR ACTIVATING A NOBLE-METAL-ALUMINA-ALUMINUM HALIDE CATALYST
Emmett H. Burk, Jr., Hazel Crest, and Owen H. Thomas, Dolton, Ill., assignors to Sinclair Refining Company, New York, N.Y., a corporation of Maine
No Drawing. Filed Dec. 15, 1959, Ser. No. 859,593
7 Claims. (Cl. 208—139)

This invention relates to a process for the activation of noble metal-alumina-Friedel-Crafts aluminum halide catalysts in the presence of a hydrocarbon feed, particularly while processing a hydrocarbon feed under normal operating conditions. These catalysts have particular utility in the hydrocarbon conversion field, e.g. cracking, isomerization and alkylation processes and especially in a process directed to the isomerization of $C_4$ to $C_9$ n-paraffin-containing hydrocarbon materials at relatively low temperatures while obtaining satisfactory conversion to isomer structures.

The noble metal-aluminum halide-alumina catalyst emloyed in hydrocarbon conversion processes may become at least temporarily deactivated during use. For example, its hydrocarbon conversion activity is significantly reduced or more specifically, its isomerization, cracking or alkylating activity is reduced below the activity limits desirable for the catalyst in any of the hydrocarbon conversion processes in which the catalyst is used. For instance, a deactivated catalyst can be described as one which has lost about 20 to 80% of its virgin activity, but preferably before it has lost about 50% of its virgin activity. This deactivation frequently occurs due to the loss of aluminum halide by vaporization under processing conditions.

One method of replacing or adding the aluminum halide to the catalyst includes dissolving the aluminum halide in the hydrocarbon feed before processing the feed with the catalyst in a reaction zone under normal processing conditions, i.e. while continuously adding the feed to the reaction zone. This addition procedure was thought to be particularly desirable since it would provide for more efficient processing conditions due to the avoidance of processing cessations for the purpose of adding or replacing the aluminum halide. When following this procedure, however, the aluminum halide complexes with certain contaminants in the feed as well as cracks the feed and complexes with the cracked products. This has been found to deactivate the catalyst and a catalyst deactivated in this way requires a complex regeneration, for instance, by a procedure described in the copending application of Keith, Burk and Mooi Serial No. 712,313, filed January 31, 1958. Thus, whatever time is gained by dissolving the aluminum halide in the feed is lost as a result of the necessity for more frequent regeneration of the catalyst and the necessity for the use of a more difficult regeneration technique.

When following the process of the present invention, however, the aluminum halide can be added in the presence of a hydrocarbon stream in a reaction zone under normal operating conditions while at the same time substantially avoiding formation of catalyst contaminating aluminum halide complexes and thus avoiding an increase in the frequency of regeneration. Thus, the process of the present invention provides for the addition or replacement of aluminum halide and the avoidance of processing cessations for regeneration.

In the process of the present invention, the aluminum halide is provided for a noble metal-alumina-Friedel-Crafts-aluminum halide catalyst in a reaction zone while processing a hydrocarbon feed under normal operating conditions wherein the hydrocarbon feed is continuously introduced in a stream to the reaction zone. This process includes adding the aluminum halide in vapor form in reactivation amounts sufficient to activate the catalyst under conditions which will maintain the aluminum halide in vapor form. This aluminum halide vapor is conducted to the reaction zone separately from or independently of the hydrocarbon stream. The aluminum halide vapor is preferably conducted in vapor form at a temperature lower than the temperature of the reaction zone to avoid any posibility of condensation in the reactor lines. It can be carried to the reaction zone in a flowing stream of inert or non-oxidizing gas such as a hydrogen-containing gas, e.g. hydrogen, nitrogen, hydrogen and nitrogen or hydrogen and hydrogen halide. However, since a stream of hydrogen or hydrogen and hydrogen halide gas is generally introduced into the reaction zone in the processing of feeds using the noble metal-alumina-aluminum halide catalysts, the aluminum halide vapor is preferably incorporated in the hydrogen or hydrogen halide stream and carried to the reaction zone in accordance with the present process.

The carrier gas for the aluminum halide vapor can generally contain from about 0.001 to 80 volume percent of aluminum halide, preferably from about 0.01 to 5 volume percent, and is maintained under conditions sufficient to keep the aluminum halide in vapor phase. These conditions include a temperature sufficient to maintain the aluminum halide in vapor form under the pressure employed. Generally this temperature will be from about 100 to 500° F., preferably from about 200 to 300° F., while the pressure will be from about 100 to 2000 p.s.i.g., preferably about 200 to 1000 p.s.i.g. The reactivation is continued for a time sufficient to reactivate the catalyst ot a desirable activity level.

The aluminum halide is added to a catalyst which contains a catalytically effective amount of a noble or platinum group metal, a deficiency in aluminum halide-Friedel-Crafts component and, at least ultimately in the isomerization system, a hydrogen halide, all of which are supported on an alumina base. The base is usually the major component of the catalyst, constituting about 40 to 95 weight percent, preferably at least about 50%. The catalyst base is an activated or gamma-alumina such as those derived by calcination of amorphous hydrous alumina, alumina monohydrate, alumina trihydrate or their mixtures. The catalyst base precursor most advantageously is a mixture predominating in, or containing a major proportion of, for instance about 65 to 95 weight percent, one or more of the alumina trihydrates bayerite I, bayerite II (randomite) or gibbsite, and about 5 to 35 weight percent of alumina monohydrate (boehmite), amorphous hydrous alumina or their mixture. The alumina base can contain small amounts of other solid oxides such as silica, magnesia, boria, natural or activated clays (such as kaolinite, montmorillonite, halloysite, etc.), titania, zirconia, etc., or their mixtures.

The catalyst generally contains about 0.01 to 2 weight percent, preferably 0.1 to 0.75 weight percent, of one or more of the platinum metals of group VIII, that is platinum, palladium, rhodium, ruthenium, osmium or iridium. The small amount of noble metal may be present in the metallic form or as a sulfide, oxide or other combined form. The metal may interact with other constituents of the catalyst, but if during use the noble metal be present in metallic form then it is preferred that it be so finely divided that it is not detectable by X-ray diffraction means, i.e. that it exists as crystals of less than 50 Angstrom units size. Of the noble metals, platinum is preferred.

The aluminum halide Friedel-Crafts component usually is about 2 to 50 weight percent, preferably about 10 to 30 weight percent, of the catalyst and this component can be, for instance, $AlCl_3$, $AlF_3$, $AlBr_3$ and similar metal halides where one or more of the anions are replaced with another anion such as hydroxide. Mixtures of these Friedel-Crafts components can also be used; aluminum chloride is, however, the preferred Friedel-Crafts component.

Another component of the catalyst can be a hydrogen halide and the catalyst may advantageously contain about 0.5 to 15 weight percent or more of a hydrogen halide. The hydrogen halides include, for instance, hydrogen chloride, hydrogen bromide, hydrogen fluoride and their mixtures and preferably the amount of this component on the alumina base is less than about 10% of the catalyst. Although the components of the catalyst can vary; as illustrated above, the preferred catalyst employed in the process of our invention contains platinum and aluminum chloride deposited on activated alumina.

The preferred base or supporting material is an activated or gamma-alumina made by calcining a precursor predominating in alumina trihydrate. An alumina of this type is disclosed in U.S. Patent 2,838,444. The alumina base is derived from a precursor alumina hydrate composition containing about 65 to 95 weight percent of one or more of the alumina trihydrate forms gibbsite, bayerite I and bayerite II (randomite) as defined by X-ray diffraction analysis. The substantial balance of the hydrate is amorphous hydrous or monohydrate alumina. Trihydrates are present as well-defined crystallites, that is they are crystalline in form when examined by X-ray diffraction means. The crystallite size of the precursor alumina trihydrate is relatively large and usually is in the 100 to 1000 Angstrom unit range. The calcined alumina has a large portion of its pore volume in the pore size range of about 100 to 1000 Angstrom units generally having about 0.1 to about 0.5 and preferably about 0.15 to about 0.3 cc./g. of pore volume in this range. As described in these applications the calcined catalyst can be characterized by large surface area ranging from about 350 to about 500 or more square meters/gram when in the virgin state as determined, for example, by the BET adsorption technique. A low area catalyst prepared by treating the predominantly trihydrate base precursor is described in U.S. Patent 2,838,445. This base when in the virgin state has substantially no pores of radius less than 10 Angstrom units and the surface area of the catalyst is less than 350 square meters/gram and most advantageously is in the range of about 150 to 300 square meters/gram.

The catalyst can be advantageously prepared in accordance with a process described in copending application Serial No. 712,315, filed January 31, 1958. According to this process, the aluminum halide-Friedel-Crafts catalyst is added to a noble metal-activated alumina composition. The noble metal-activated alumina composition can be prepared by known procedures. For instance, the platinum metal component can be deposited on a calcined or activated alumina, but it is preferred to add the platinum metal component to the alumina hydrate base precursor. Thus platinum can be added through reaction of a halogen platinic acid, for instance, fluoro-, chloro-, bromo- or iodo-platinic acid, and hydrogen sulfide in an aqueous slurry of the alumina hydrate. The hydrogen sulfide can be employed as a gas or an aqueous solution. Alternatively, the platinum component can be provided by mixing an aqueous platinum sulfide sol with the alumina hydrate. This sol can be made by reaction in an aqueous medium of a halogen platinic acid with hydrogen sulfide. The alumina hydrate containing the platinum metal can be dried and calcined usually at a temperature from about 750 to 1200° F. or more to provide the activated or gamma-alumina modifications. The addition of the Friedel-Crafts component to the high area catalyst bases of U.S. Patent 2,838,444 has been found to decrease the surface area, for instance, directionally related to the amount of Friedel-Crafts component added. Use of the catalyst in the isomerization system or hydrogen pretreatment increases the area apparently through loss of the Friedel-Crafts component.

An initial portion of a catalytically effective amount of an aluminum halide-Friedel-Crafts component can be added to the noble metal-alumina composition in vapor form in a flowing gas such as nitrogen, for example before processing hydrocarbon materials. However, we prefer to place a catalytically effective amount of the aluminum halide-Friedel-Crafts component in vapor form on the platinum-alumina composition before processing hydrocarbon materials by placing the Friedel-Crafts component and the noble metal-alumina composition in a common vessel provided with some means for agitating the mixture of materials, applying heat and agitating the mixture to produce the catalyst. Alternatively, the process of the present invention can be employed to add the aluminum halide to the noble metal-alumina composition while processing the hydrocarbon feed.

A hydrogen halide component can be added to the noble metal-alumina-aluminum halide composite by supplying the hydrogen halide as such or by employing an organohalogen compound or other substance which will produce the hydrogen halide. The hydrogen halide can be added to the composite by contacting the composite directly with hydrogen halide. When using the catalyst in a conversion process, however, such as the isomerization of $C_4$ to $C_9$ n-paraffin-containing hydrocarbon materials, the hydrogen halide can be added to the noble metal-aluminum halide-alumina composite after it is placed in the isomerization reactor. Conveniently this is done by including in the n-paraffin feed about 0.05 to 35 weight percent, advantageously about 0.5 to 5 weight percent of the hydrogen halide or of a hydrogen halide-producing material. The addition of the hydrogen halide in these concentrations based on the n-paraffin, is continued over the processing period in order to maintain an adequate concentration of this component on the alumina base and insure the stability of the catalyst against undue aging. The hydrogen halide can be added separately to the reaction system, in the hydrogen-containing recycle gases or in the n-paraffin feedstock. Also, as pointed out above, the hydrogen halide on the alumina base might be added to the catalyst before charging it to the reactor.

When using an organo-halogen compound or other substance as the hydrogen halide supplier, they can also be employed to conveniently supply the hydrogen halide to the catalyst composite under conditions which the catalyst may be subjected to. Suitable hydrogen halide precursors include the elemental halogens, chlorine, bromine and fluorine; mono- and polyhalo-alkanes such as carbon tetrachloride, chloroform and tertiary butyl chloride; or other available materials which will be converted under the conditions of the process in which the catalyst is used, for instance when under isomerization conditions of free hydrogen and temperatures of about 150 to 450° F., to obtain the hydrogen halide.

The noble metal-aluminum halide-alumina catalyst is particularly suitable for use in an isomerization process permitting the use of relatively low reaction temperatures for the isomerization of n-paraffinic hydrocarbons to obtain good yields of branched chain aliphatic structures as described in the above-mentioned application of Keith and Burk Serial No. 683,931, filed September 16, 1957, now U.S. Patent No. 2,843,470. The branched chain aliphatic structures are highly useful as a component for improving the octane rating of gasoline.

This isomerization process includes contacting $C_4$ or $C_5$ to $C_9$ n-paraffinic hydrocarbon material, in vapor form, with a platinum-aluminum halide-alumina catalyst at a temperature of about 150 to 450° F. in the presence of free hydrogen and while providing hydrogen halide preferably in the n-paraffinic hydrocarbon feed. The hydrogen halide may be provided by a precursor such as carbon tetrachloride under the reaction conditions.

Free or molecular hydrogen must be present in the isomerization reaction system and the hydrogen to n-paraffin molar ratio will usually be from about 0.01 to 15:1 or more, preferably about 1 to 10:1. When processing n-butane the lower concentrations of hydrogen, e.g. less than a one to one molar ratio of hydrogen to n-butane, may be usable with advantage. Conveniently, the hydrogen concentration is maintained by recycling hydrogen-rich gases from the reaction zone. These gases contain hydrogen halide at least after the initial processing period and as there is usually no substantial consumption of the halide after this period the desired concentration in the feed can be maintained merely by recycling the hydrogen-containing gases, for instance, the hydrogen halide concentration can with advantage be about 0.5 to 35 volume percent of the recycled gases.

The feed material employed in hydrocarbon conversion processes using the noble metal-aluminum halide-alumina catalyst can be derived from crude petroleum hydrocarbons, as by distillation, reforming or extraction processes and is usually desulfurized using a conventional hydrodesulfurization catalyst, e.g. a cobalt-molybdena catalyst, under hydrodesulfurization conditions, e.g. about 650 to 750° F. and 1000 p.s.i.g. The feed is generally a $C_4$ to $C_{12}$ paraffin containing hydrocarbon cut of, for example, a straight run gasoline, but often in the case of isomerization feeds, is a $C_4$ to $C_9$ n-paraffin-containing cut, while in the case of cracking feeds it is often a hydrocarbon material containing a predominant amount of $C_8$ to $C_{12}$ paraffinic materials and in the case of alkylation feeds it is often a hydrocarbon material containing $C_4$ to $C_{10}$ paraffinic materials.

The following specific examples will serve to illustrate the present invention but are not to be considered limiting.

EXAMPLE I (A)

A noble metal-alumina composition of the kind described in U.S. Patent 2,838,444 can be employed in the process of our invention. The composition of this application can be made as follows. Pure aluminum metal is dissolved in pure hydrochloric acid, and the resulting solution is mixed with deionized water to form an aqueous aluminum chloride solution and an alumina gel is prepared equivalent to approximately 65 grams of $Al_2O_3$ per liter. A separate deionized water solution of $NH_4OH$ is prepared containing approximately 65 grams of ammonia per liter. These two reagents in approximate volume ratio of 1:1 are intimately mixed as a flowing stream at a pH of 8.0. The flowing stream is passed to a stoneware container and an alumina hydrate is visible. The precipitated hydrate is filtered from the mother liquor and washed to <0.2% chloride by successive filtrations and reslurryings in deionized water until the desired chloride concentration is reached. The washed hydrate is covered with water in a container and aged at about 90° F. until it is approximately 70% trihydrate, the remaining being substantially of the amorphous or monohydrate forms. The total hydrate composition is comprised of about 42% bayerite, 18% randomite, 11% gibbsite, 20% boehmite and 9% amorphous as determined by X-ray diffraction analysis. The aged hydrate is mixed with deionized water in a rubber lined container to provide a slurry of about 7 weight percent $Al_2O_3$ at a pH of about 8.0. A chloroplatinic acid solution in deionized water (0.102 gram platinum per milliliter) is stirred into the slurry and the slurry is then contacted with a deionized water solution which has been saturated with $H_2S$ at 78° F. to precipitate the platinum. The pH of the slurry is adjusted to 6.0 to 6.5 by ammonium hydroxide addition and the solids of the slurry are dried on a horizontal drum drier to give a powder of generally less than 20 mesh. The drum dried powder is mixed in a planetary type dough beater with sufficient deionized water to indicate 26 weight percent water on a Central Scientific Company Infra-red Moisture Meter containing a 125 watt bulb, Cat. No. 26675. The resulting mixture is forced through a die plate having holes $1/16''$ in diameter bolted to a $3\frac{1}{2}''$ welding engineer's screw extruder. The resulting strands are broken to particles of length varying generally between about $1/16''$ to $1''$.

The particles are dried at 230° F. and calcined by heating to 925° F. in a flow of nitrogen gas followed by a flow of air while the catalyst is maintained at a temperature in the range of 865 to 920° F. The composition thus produced analyzes about 0.6 weight percent of platinum which is in sufficiently divided form so as to exhibit by X-ray diffraction studies the substantial absence of crystallites or crystals of size larger than 50 Angstrom units. After the calcination the composition has an area (BET method) within the range from bout 350 to 550 square meters/gram.

(B)

A platinum-alumina composition prepared essentially as described above in (A), except that air was used for the complete calcination procedure and containing about 0.6% platinum was employed in the process of the present invention by the following procedure. A one-liter, three-necked flask was fitted with a heating mantle, thermometer and an air inlet line having a drying tower filled with Drierite. The flask was fastened to a Syntron Paper Jogger which provided agitation of the catalyst during the impregnation. The flask was swept out with dry air for about 10 minutes. 150 grams of the platinum-alumina composition and 45 grams of aluminum chloride were charged to the flask. The air was turned off, the flask was stoppered and the drying tower was disconnected from the air line. Heating of the flask was begun and the temperature of the mixture was brought slowly to approximately 445° F. in about three hours. The heat was turned off and the catalyst was cooled and transferred to a moisture-tight container. The resulting catalyst contained 19.3 weight percent aluminum chloride based upon the platinum-alumina catalyst.

(C)

Hydrogen halide may be added to a noble metal-activated alumina-aluminum halide composition prior to charging the composition into processing equipment, e.g. an isomerization reactor, in accordance with the following procedure.

20 grams of catalyst composite per Example I(B) is charged to a one-inch I.D. Pyrex tube, fitted with a support medium and drying tube at outlet. Arrangements are made to pass dry nitrogen, followed by hydrogen at one atmosphere pressure. Into the hydrogen stream is introduced about 5 volume percent of dry hydrogen chloride. This mixture is advantageously at a rate of about 300 VHSV (volume of gas per volume of catalyst per hour space velocity). This treatment is continued for one hour during which there is an appreciable rise in temperature from the exothermic interaction of the hydrogen chloride and the $AlCl_3$/platinum/alumina composition. After one hour the source of hydrogen chloride is shut off, the hydrogen flow continued for a few minutes, then followed by passage of dry nitrogen for about 15 minutes. The catalyst is discharged from the Pyrex tube in a manner to avoid contact with the moisture in the air. This treatment adds about one and one-half percent chloride to the catalyst.

EXAMPLE II

*Vapor Phase $AlCl_3$ Addition in Presence of Hydrocarbon Feed*

Aluminum chloride is added to a platinum-aluminum chloride-alumina catalyst (480–47), prepared essentially according to the procedure set forth in Example I above, to reactivate the catalyst while the catalyst was being employed in an isomerization process under normal operating conditions.

The feed employed in the isomerization process is a hydrogenated Phillips commercial grade pentane-hexane blend (33% pentane and 67% hexane) containing 18±1 weight percent naphthenes and the isomerization conditions include a temperature of 300° F., a pressure of 300 p.s.i.g., a hydrogen to hydrocarbon molar ratio of 10 to 1 as a recycle rate and 0.6 to 1 as a makeup rate, and 5 mol percent of HCl in the hydrogen to provide a HCl—$H_2$ blend. The HCl—$H_2$ blend is passed through an aluminum chloride reservoir at a temperature of 250° F. and carries vaporous aluminum chloride to the isomerization reaction zone, independently of the hydrocarbon feed, to activate the catalyst. The conditions and results are summarized in Table I.

chemisorbed on the platinum-alumina composition in the absence of hydrocarbon and hydrogen chloride. After the $AlCl_3$ addition was complete, an activity check was made at normal processing conditions. These results are summarized in Table II.

TABLE II.—REACTOR PREPARATION OF PLATINUM-ALUMINUM HALIDE - ALUMINA FROM PLATINUM - ALUMINA

| Processing Conditions | 300° F., 300 p.s.i.g., 1 WHSV, 10/1 ($H_2/H'C$)M recycle rate, (0.6/1)M makeup rate, 5 wt. percent HCl—$H_2$ blend, hydrogenated Phillips commercial grade $C_5$-$C_6$ blend: 18±1 wt. percent naphthenes, $AlCl_3$ added in $H_2$—HCl carrier gas with no hydrocarbon processing until addition was completed. | | |
|---|---|---|---|
| Platinum-alumina catalyst No | 480-1038 | | |
| Conditions for $AlCl_3$ addition: | | | |
| Grams. $AlCl_3$ added | 16 | | |
| Temp., °F., of $AlCl_3$ reservoir | 265–325 | | |
| Addition time, hrs | 50 | | |
| Temp., °F., of catalyst bed | 300 | | |
| Pressure, p.s.i.g | 300 | | |
| $H_2$—HCl recycle rate, cu. ft./hr | | | |
| $H_2$ makeup rate, cu. ft./hr | 2.5 | | |
| Activity check after addition: | | | |
| i-$C_5$ yield | 70.1 | 68.0 | 66.9 |
| i-$C_6$ yield | 87.0 | 87.5 | 88.9 |
| Hrs. on stream with hydrocarbon processing | 1 | 3 | 7 |
| Discharge Catalyst: | | | |
| Wt. percent Cl | 12.78 | | |
| Wt. percent Fe | 0.022 | | |
| Area, m.²/g | 220 | | |

TABLE I

| Processing Conditions | 300° F., 300 p.s.i.g., 1 WHSV (10/1 $H_2/H'C$)M recycle rate, (0.6/1)M makeup rate, 5 wt. percent HCl—$H_2$ blend. | | | |
|---|---|---|---|---|
| Catalyst No | 480-47 | | | |
| Wt. percent Cl virgin | 10.69 | | | |
| Wt. percent S virgin | 0.20 | | | |
| Wt. percent Fe virgin | 0.0065 | | | |
| Activity Check: | | | | |
| Feed [1] | 2 | | | |
| i-$C_5$ yield | 32.0 | | | |
| i-$C_6$ yield | 74.3 | | | |
| Conditions for $AlCl_3$ Addition: | | | | |
| Gms. $AlCl_3$ added | 4.75 | | | |
| Temp., °F., of $AlCl_3$ reservoir | 250 | | | |
| Addition time, hrs | 12 | | | |
| Temp., °F., of catalyst bed | 300 | | | |
| Pressure, p.s.i.g | 300 | | | |
| $H_2$—HCl recycle rate, cu. ft./hr | 4.7 | | | |
| $H_2$—HCl makeup rate, cu. ft./hr | 0.3 | | | |
| Activity Checks During and After Addition: | | | | |
| Feed [1] | 2 | 2 | 2 | 2 |
| i-$C_5$ yield | 27.2 | 62.3 | 57.5 | 58.4 |
| i-$C_6$ yield | 71.5 | 85.9 | 86.4 | 85.8 |
| Hrs. on stream from initiation of addition | 2 | 12 | 14 | 19 |
| Discharged Catalyst: | | | | |
| Wt. percent Cl | 12.99 | | | |
| Wt. percent Fe | 0.0087 | | | |
| Area, m.²/g | 213 | | | |

[1] Feed: Hydrogenated Phillips commercial grade $C_5$-$C_6$ blend, 18±1 wt. percent naphthenes.

The vapor phase addition procedure described above for the reactivation of low chloride platinum-aluminum halide-alumina compositions restores catalyst activity to a near virgin level. As a check of these techniques, an attempt was made to prepare a platinum-aluminum halide-alumina catalyst in the reactor by passing aluminum chloride vapor over a pre-reduced platinum-alumina composition. In this preparation aluminum chloride was The above results show that active noble metal-aluminum halide-alumina catalysts can be prepared or reactivated through vapor phase aluminum chloride additions to a noble metal-alumina composition or a noble metal-aluminum halide-alumina composition in accordance with the process of the present invention. Surprisingly, the addition of aluminum halide vapor to the catalyst in the presence of hydrocarbon feed does not result in an increase in the hydrocarcking activity of the catalyst, which causes the formation of catalyst contaminating aluminum halide-hydrocarbon complexes, during the reactivation period. Shortly after the noble metal-alumina composition is initially subjected to the aluminum halide component, it is deficient in aluminum halide and is so until it has received activation amounts of this component.

It is claimed:
1. A process for activating a platinum group noble metal-alumina-Friedel-Crafts-aluminum halide hydrocarbon conversion catalyst in a reaction zone while processing hydrocarbon feed wherein the deactivation is a result of a deficiency in aluminum halide content, a step comprising conducting aluminum halide in vapor form and in activation amounts under conditions sufficient to maintain the aluminum halide in vapor form, to the reaction zone separately from the hydrocarbon feed for a time sufficient to activate the catalyst.

2. The process of claim 1 wherein the hydrocarbon feed includes a $C_4$ to $C_9$ n-paraffinic hydrocarbon material in vapor form and the processing is conducted under isomerization conditions including a temperature of about 150 to 450° F., and the presence of free hydrogen and hydrogen halide.

3. The method of claim 2 where the noble metal is platinum.

4. The method of claim 1 where the noble metal is platinum.

5. The method of claim 2 wherein the aluminum halide is conducted to the reactor zone in a non-oxidizing gas.

6. The method of claim 5 wherein the non-oxidizing gas is a hydrogen-containing gas including from about 0.001 to 80 volume percent of the aluminum halide.

7. The method of claim 6 wherein the noble metal is platinum and the hydrogen-containing gas includes from about 0.01 to 5 volume percent of aluminum halide and is at a temperature in the range of about 100–500° F. and lower than the temperature of the reaction zone.

References Cited in the file of this patent

UNITED STATES PATENTS

| | | |
|---|---|---|
| 2,323,830 | McMillan | July 6, 1943 |
| 2,900,425 | Bloch et al. | Aug. 18, 1959 |